US011030722B2

(12) United States Patent
Condorovici

(10) Patent No.: US 11,030,722 B2
(45) Date of Patent: Jun. 8, 2021

(54) SYSTEM AND METHOD FOR ESTIMATING OPTIMAL PARAMETERS

(71) Applicant: FotoNation Limited, Galway (IE)

(72) Inventor: Razvan G. Condorovici, Bucharest (RO)

(73) Assignee: FotoNation Limited, Galway (IE)

( * ) Notice: Subject to any disclaimer, the term of this patent is extended or adjusted under 35 U.S.C. 154(b) by 246 days.

(21) Appl. No.: 16/152,364

(22) Filed: Oct. 4, 2018

(65) Prior Publication Data
US 2019/0108621 A1 Apr. 11, 2019

Related U.S. Application Data

(60) Provisional application No. 62/568,118, filed on Oct. 4, 2017.

(51) Int. Cl.
| | | |
|---|---|---|
| *G06T 5/00* | (2006.01) | |
| *G06K 9/62* | (2006.01) | |
| *G06K 9/66* | (2006.01) | |
| *G06N 3/00* | (2006.01) | |

(52) U.S. Cl.
CPC ............ *G06T 5/001* (2013.01); *G06K 9/6256* (2013.01); *G06K 9/66* (2013.01); *G06N 3/00* (2013.01); *G06T 2207/20081* (2013.01); *G06T 2207/20084* (2013.01)

(58) Field of Classification Search
CPC ...... G06K 9/6256; G06K 9/66; G06N 3/0454; G06N 3/084; G06N 3/0481; G06N 3/00; G06T 5/001; G06T 2207/20081; G06T 2207/20084
See application file for complete search history.

(56) References Cited

U.S. PATENT DOCUMENTS

| | | | | |
|---|---|---|---|---|
| 5,185,850 | A * | 2/1993 | Usui ........................ | G06N 3/04 706/17 |
| 10,627,820 | B1* | 4/2020 | Abeloe ............ | B60W 30/0956 |
| 2016/0125572 | A1* | 5/2016 | Yoo ....................... | G06T 15/205 382/157 |
| 2016/0307098 | A1* | 10/2016 | Goel .................... | G06N 3/0454 |

(Continued)

FOREIGN PATENT DOCUMENTS

JP 2015191577 A * 11/2015

OTHER PUBLICATIONS

Hui Fang and Meng Zhang: "Creatism: A deep-learning photographer capable of creating professional work", phoarXiv: 1707.03491v1 [cs.CV] Jul. 11, 2017, 14 pages.

*Primary Examiner* — Mekonen T Bekele
(74) *Attorney, Agent, or Firm* — Lee & Hayes, P.C.

(57) ABSTRACT

A method and system of generating an adjustment parameter value for a control parameter to enhance a new image, which includes configuring a neural network, trained to restore image quality for a derivative image, to that of an earlier version of the derivative image, to generate as an output the adjustment parameter value, for the control parameter in response to input of data derived from the new image, and changing a control parameter of the new image, by generating the adjustment parameter value by calculating an inverse of the output value, and applying the adjustment parameter value to the control parameter of the new image so as to generate an enhanced image.

27 Claims, 16 Drawing Sheets

(56) References Cited

U.S. PATENT DOCUMENTS

| | | | |
|---|---|---|---|
| 2016/0379112 A1* | 12/2016 | He | G06N 3/0454 |
| | | | 706/25 |
| 2017/0083796 A1* | 3/2017 | Kim | G06K 9/00369 |
| 2017/0330586 A1* | 11/2017 | Roblek | G06F 11/0715 |
| 2018/0018757 A1* | 1/2018 | Suzuki | A61B 6/03 |
| 2018/0061051 A1* | 3/2018 | Matsunaga | A61B 5/444 |
| 2018/0204051 A1* | 7/2018 | Li | G06T 7/11 |
| 2018/0268297 A1* | 9/2018 | Okazaki | G06N 3/084 |
| 2019/0080236 A1* | 3/2019 | Maruhashi | G06K 9/6262 |
| 2019/0095794 A1* | 3/2019 | Aldana Lopez | G06N 20/00 |
| 2019/0244358 A1* | 8/2019 | Shi | G06K 9/00664 |
| 2019/0258925 A1* | 8/2019 | Li | G06F 16/583 |
| 2020/0004333 A1* | 1/2020 | Lee | G06K 9/00221 |
| 2020/0134469 A1* | 4/2020 | Choo | G06N 3/084 |

\* cited by examiner

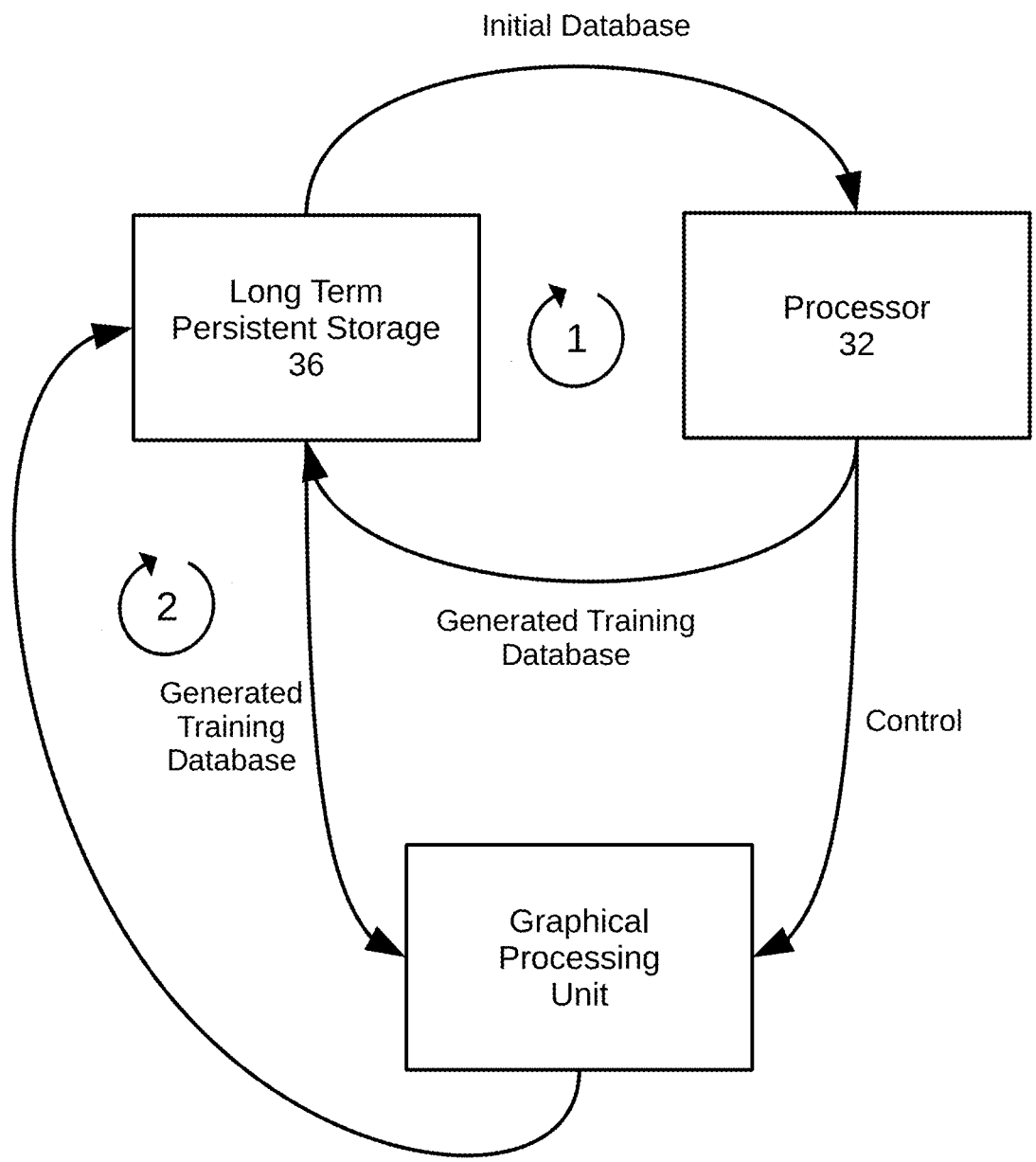
Fig. 2A, Training Hardware System

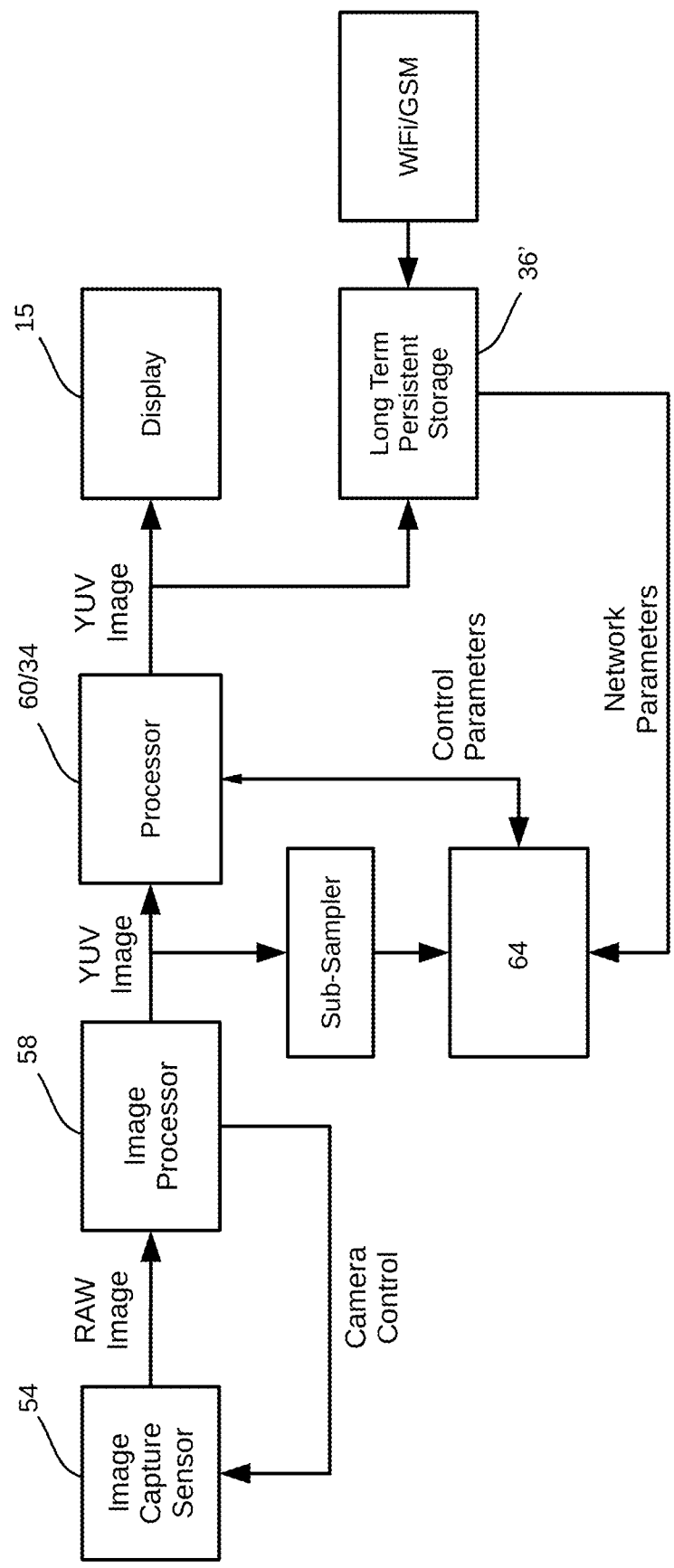
Fig. 2B, Inference Hardware System

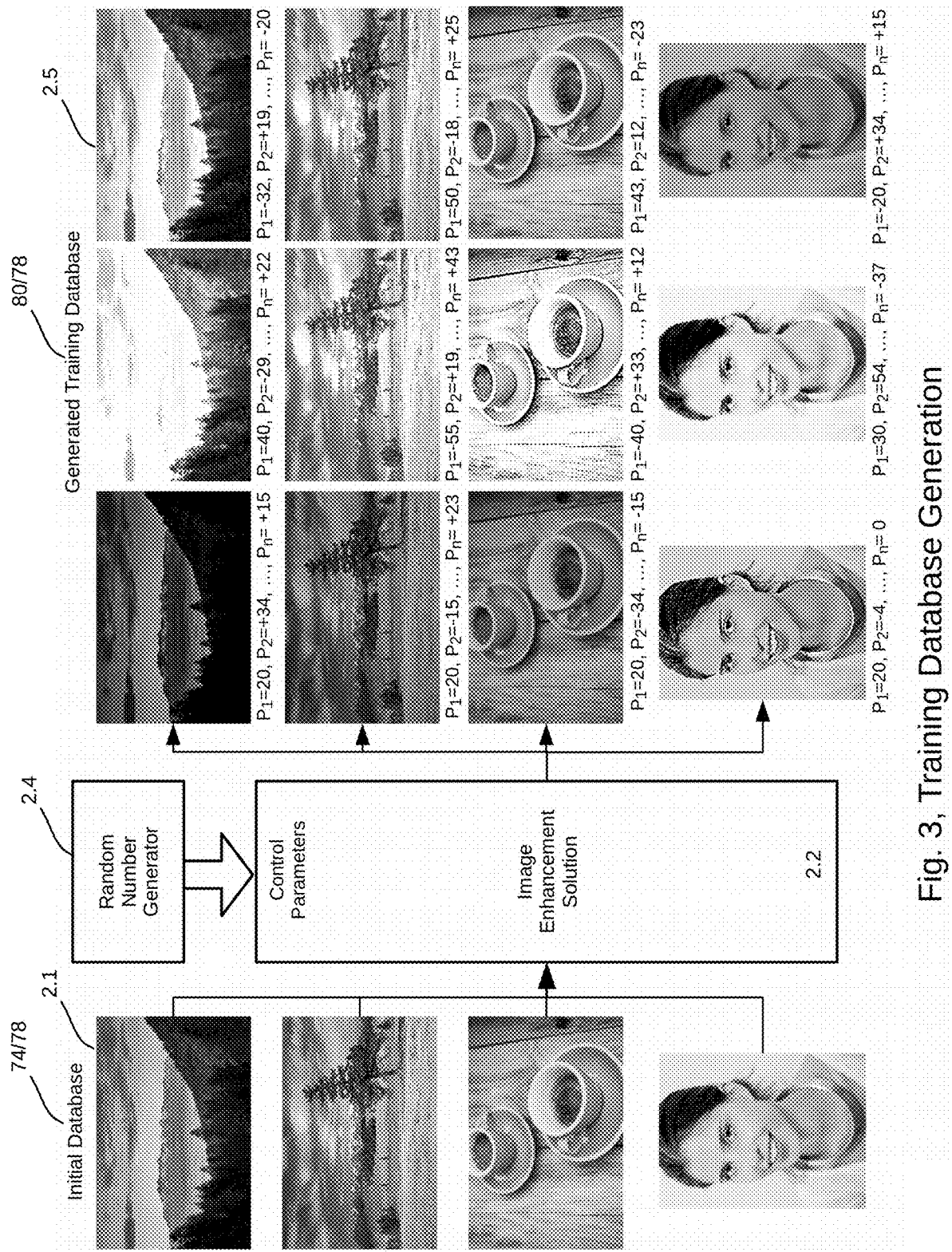
Fig. 3, Training Database Generation

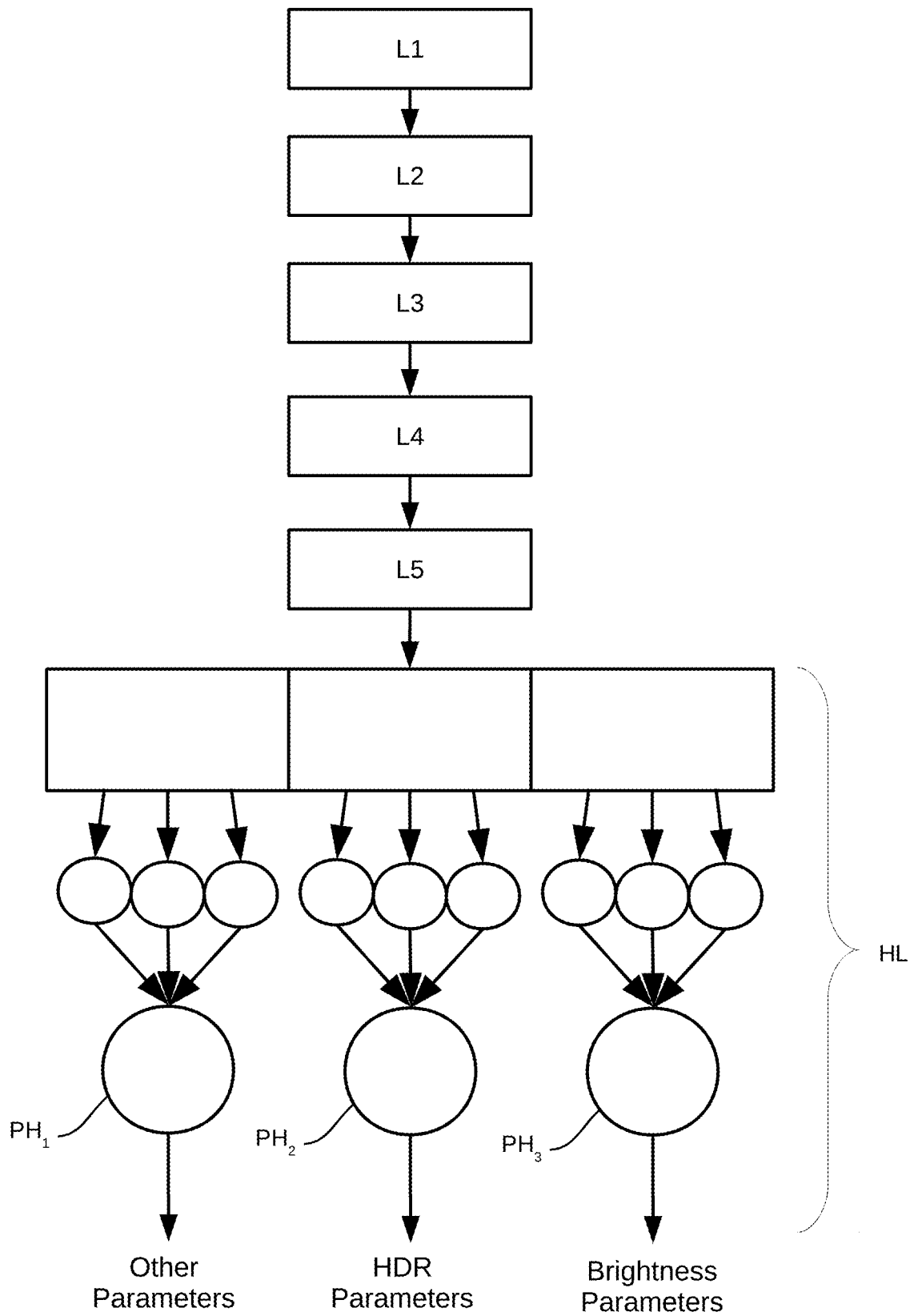
Fig. 5, Single Network Architecture for Processing Multiple Parameters

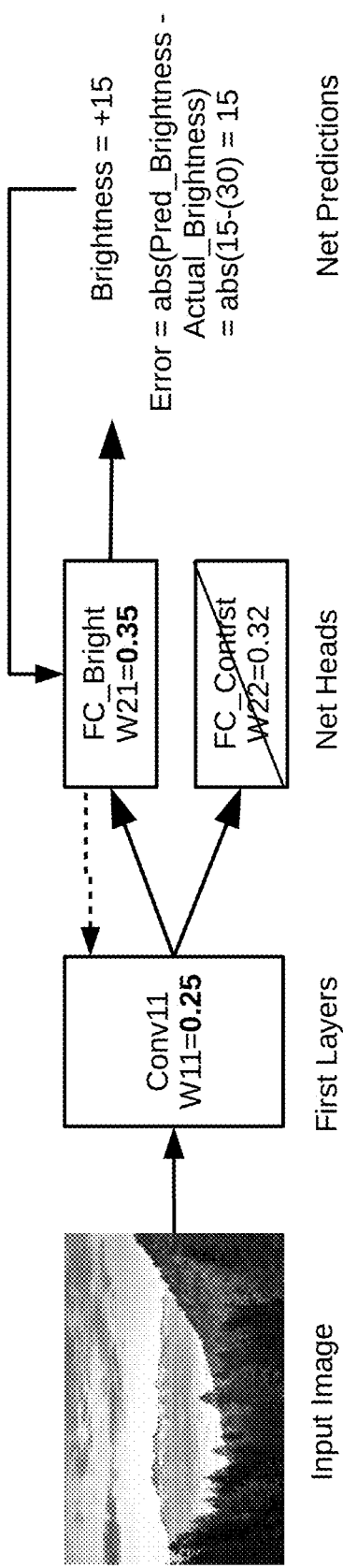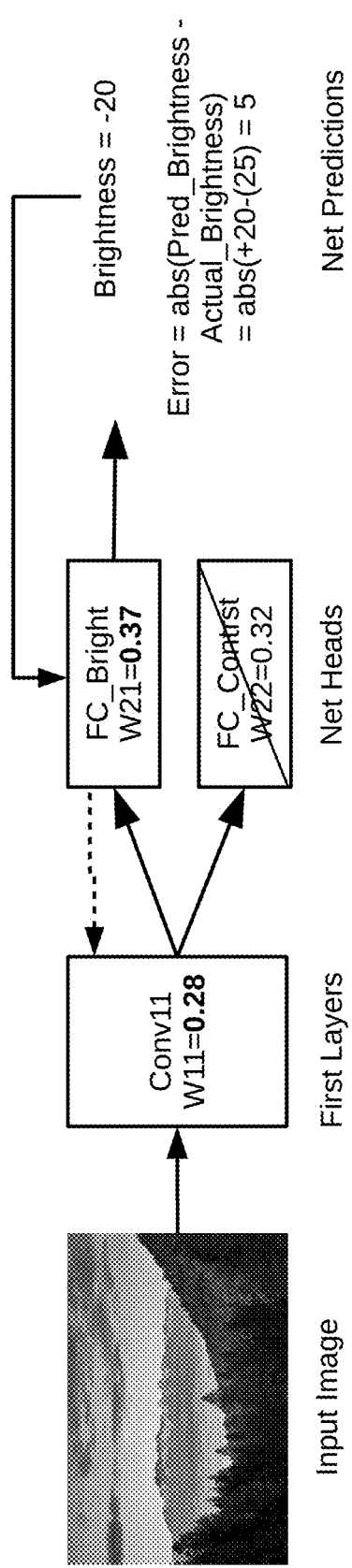
Fig. 6e
Fig. 6f

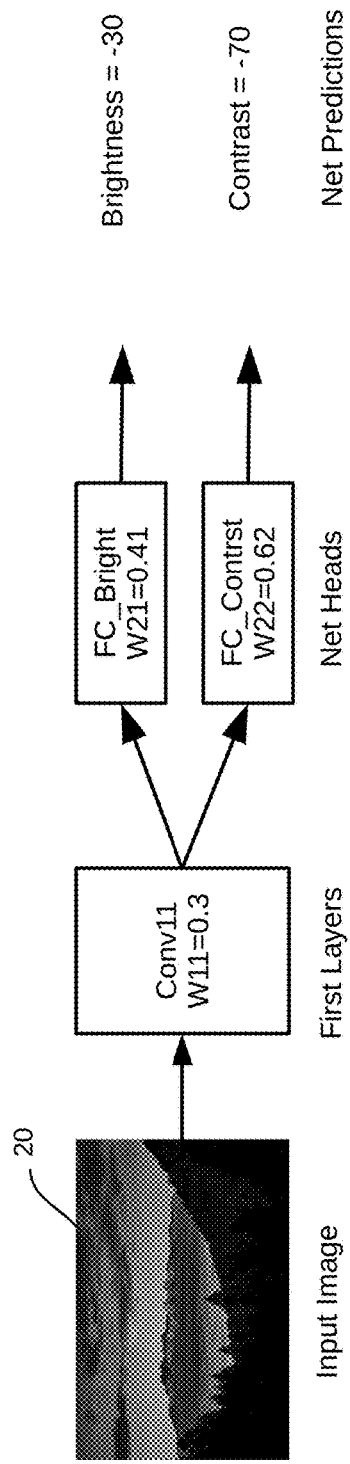
Fig. 7a, Inference
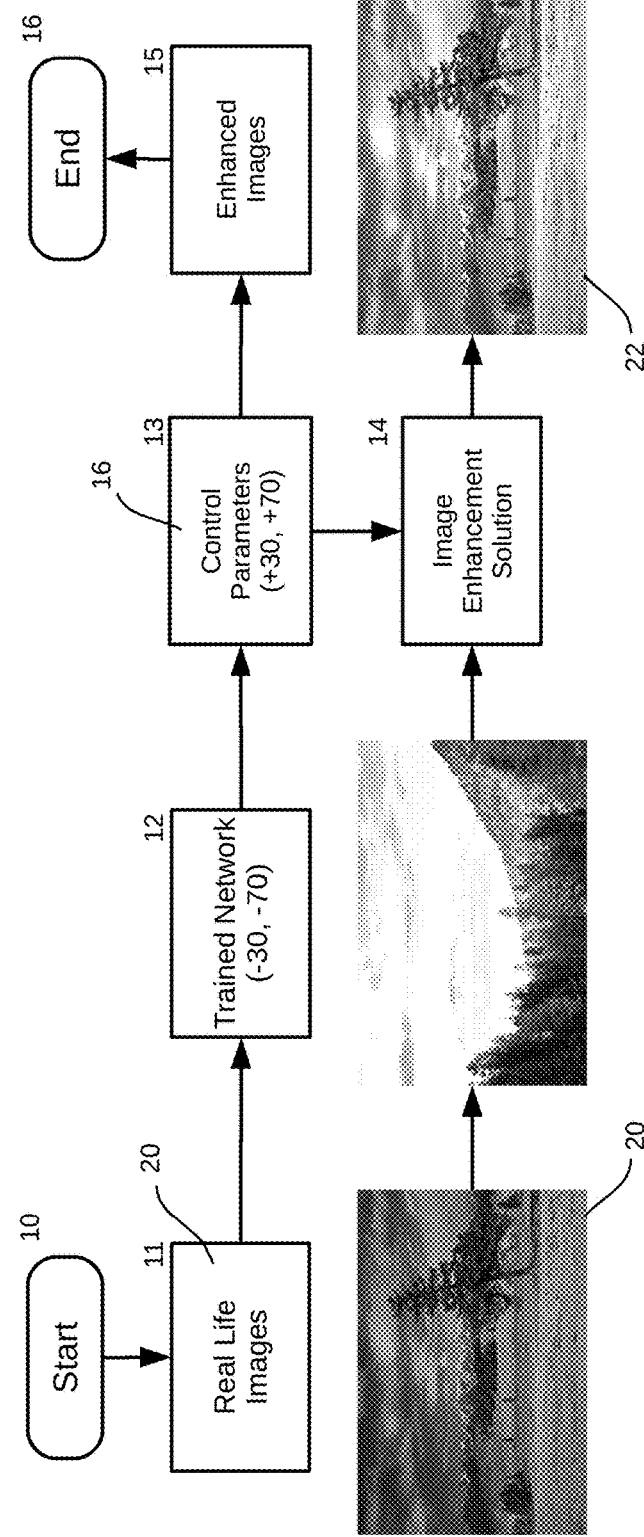
Fig. 7b, Inference

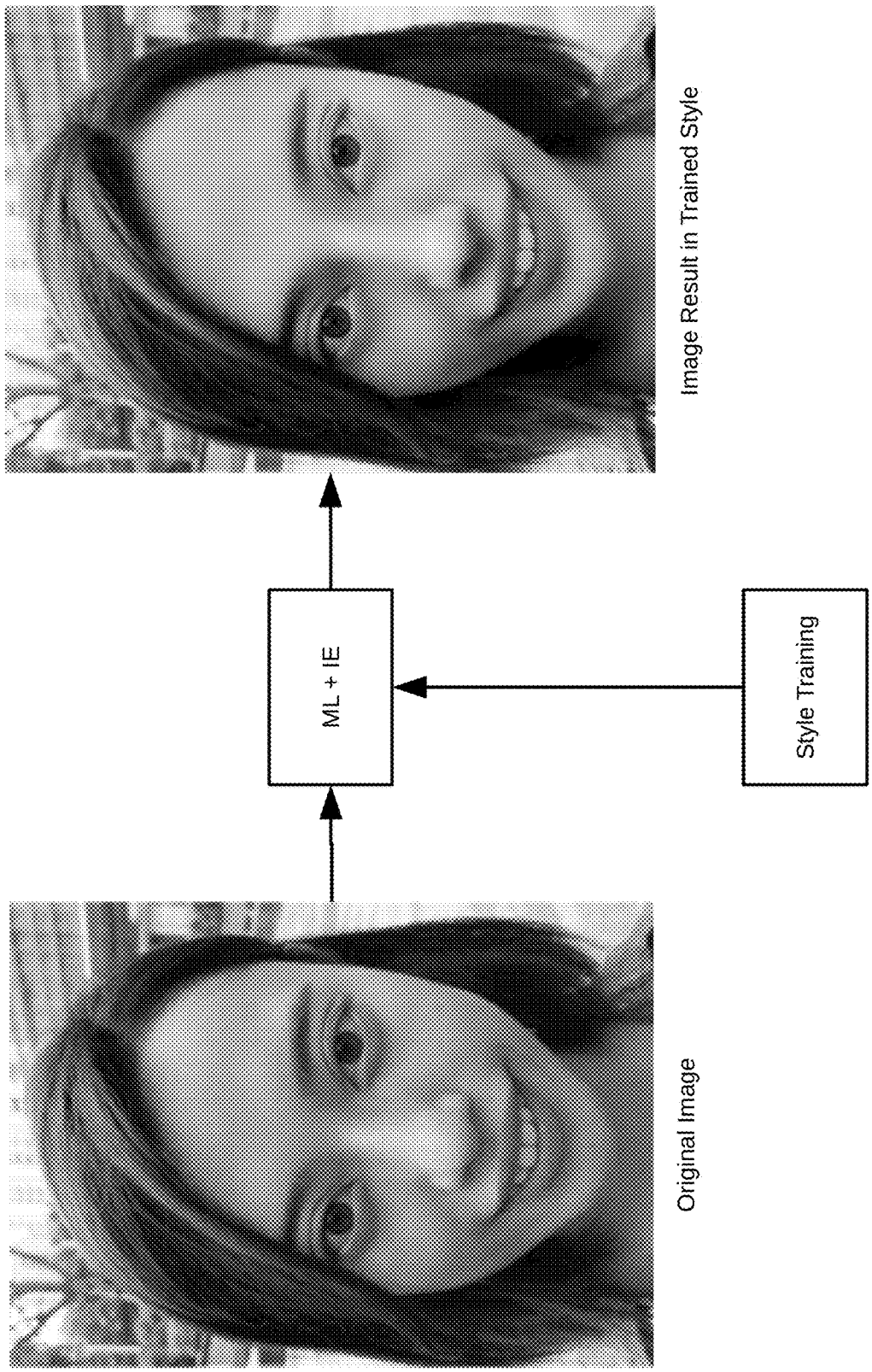

SYSTEM AND METHOD FOR ESTIMATING OPTIMAL PARAMETERS

RELATED APPLICATIONS

This application claims priority to U.S. Provisional Patent Application Ser. No. 62/568,118 "Method for estimating optimal parameters", filed 4 Oct. 2017, the content of which is now incorporated herein by reference.

FIELD OF THE INVENTION

The invention relates to image processing. In one series of embodiments, the invention provides control parameter adjustments to image data. This system may be integrated with images acquired with cameras integrated within hand-held mobile communications devices.

BACKGROUND

Users often acquire image data with small format image acquisition devices integrated within hand-held mobile communications devices. A common approach to image enhancement (IE) is based on Image Processing (IP) techniques, applying deterministic algorithms which implement configurable transformations over the image. Post acquisition, such processing of images acquired with mobile devices is implemented with specialized software running on the devices. In many instances the main goal is to present a set of enhanced, more aesthetically pleasing, images from which a user of the mobile device can make a selection or decide to acquire an additional frame of image data. While these solutions can be computationally fast, they are relatively limited in their functionality, each algorithm implementing a single selected parametric variation.

In the past, it was considered that a neural network could, in principle, be trained by comparing photos which have had one attribute randomly degraded with that of an ideal image from which it came, e.g., for ranking based on aesthetic value, followed by selection of the "best looking" image. To do this, a degraded image and an original image would be fed into a neural network specifically trained for the feature which was degraded. The network would then provide a rating on how similar the new photo was compared to the original photo. This similarity, expressed as a percentage or 0-1 rating, could then be used as a judge of the aesthetic quality of the image.

SUMMARY OF THE INVENTION

Consequently, the aesthetic enhancements available to users have been limited. Machine Learning (ML) techniques have been proposed to provide systems capable of learning from examples to render multiple image transformations, but it is a computationally intense activity to implement multiple complex transformations on the mobile device. Another disadvantage associated with some ML solutions for IE is that, after generating a large number of candidate images, typically only one image will be used as a final result with the rest of the generated images being discarded at the expense of considerable computational power. If a ML solution were to generate directly an optimal image, considerable processing time would be required, bringing into question the practicality of doing so.

It is desirable that greater IE capabilities be available to the user at the time of image acquisition with minimal processing time. In principle, optimal aesthetics can be achieved through adjusting large sets of parametric values over the wide spectrum of image types. Given the form factors and processing capabilities of mobile devices, image enhancement is limited by processing power, memory and the size of the mobile application. This constrains the number of discrete processing networks available to control a large array of parameters which could otherwise be available to optimize image aesthetics. This is particularly relevant to the broad spectrum of image types typically captured with mobile communications devices and tablets. On the other hand, the alternative of employing relatively low resolution image data to optimize control parameters enables relatively fast training and processing suitable for limited IP solutions on mobile devices. However, in the overall context of optimal aesthetic image enhancement, modification of parameters like texture and color variations (e.g., typical of facial features) requires higher resolution, demanding higher computational capabilities. Generally, there is a need for more efficient methodologies to better utilize existing hardware capabilities.

Previously proposed methodologies have several disadvantages. First, because the neural network is merely trained to determine an aesthetic quality of an aesthetics aspect of an image, in order to enhance an image, the original image would need to be randomly altered and the many variations judged for aesthetic value. Then a system would presumably pick the generated image with the highest aesthetic values. This means that a vast number of images are created and then judged in order to produce an image with the highest scored aesthetic rating for a particular parameter. In practice, this makes the process time consuming and highly consumptive of processing power, and the methodology appears to be too inefficient to be used for many applications. This is especially true if the capability is to be included on a mobile device, such as a cell phone camera, portable camera, etc.

Previous attempts and proposals also have required formation of an entirely separate neural network to be trained for each parameter which is to be graded or optimized. As such, this makes the software even more complex and memory intensive, further increasing the processing power required.

In view of the foregoing, and other known problems, drawbacks, and disadvantages of conventional approaches, an aspect of the present invention is provision of an image evaluation system which predicts how far a particular parameter of an original image is offset from an ideal or enhanced version of the original image. This may provide a system which can evaluate a single user image and provide adjustments that improve the aesthetics of the original user image in the eyes of the user. Advantageously, instead of providing an aesthetic score to judge the quality of the image, processes according to embodiments of the invention instead calculate how much a parameter is offset from what would produce the ideal or enhanced image. Implementing this concept enables an implicit evaluation of an image and correction or enhancement without creating multiple images for a particular parameter, from which a user might exercise discretionary preference to select one candidate. This dramatically improves the processing speed and hardware requirements over other systems.

Another aspect of the invention allows a single neural network to be trained and used to evaluate multiple control parameters (e.g., contrast, brightness, saturation, etc.). In this system, a portion of the convolutional layers (common layers) are used for some or all parameters to be evaluated, which specific subsections of the neural network (parameter heads) calculate the individual offset value for each control parameter. This can provide a more streamlined system which requires less processing power than does running an image though multiple neural networks to generate the control parameters individually, i.e., one per network. This can also provide large savings in processing requirements to train the single neural network.

According to a first series of embodiments, a method is provided for generating an adjustment parameter value for a control parameter that enhances a new image. Summarily, a neural network is trained to restore image quality for a derivative image to that of an earlier version of the derivative image. The neural network is configured to generate, as an output, the adjustment parameter value, for the control parameter in response to input of data derived from the new image. The control parameter of the new image is changed by generating the adjustment parameter value. The adjustment parameter value is generated by calculating an inverse of the output value. The adjustment parameter value is applied to the control parameter of the new image so as to generate an enhanced image. The adjustment parameter value may corresponds to a reversible control parameter. The control parameter may include at least one of brightness, contrast, saturation, sharpness, blur, denoise strength, tint, color temperature, parametric transformation, linear piece-wise transformation, tone compression and a face beautification parameter. The neural network may output a plurality of the output values corresponding to a plurality of control parameters in response the input of the data derived from the new image. The neural network may comprise a plurality of first layers and a plurality of parameter heads connected to receive an output from the first layers, each of the plurality of parameter heads generating one of the plurality of output values. The control parameter may be reversible such that an original image processed by a modified control parameter to produce a modified image may be restored to the original image by processing the modified image by an inverse of the modified control parameter.

In a second series of embodiments, a method is provided for training a neural network. A neural network, a benchmark image and a plurality of modification parameter values are provided. A plurality of training images are generated by modifying a control parameter of the benchmark image by each of the plurality of modification parameter values. For each of the plurality of training images: the training image is processed through the neural network to generate an output value; the output value associated with the training image is compared with the modification parameter value associated with the training image so as to generate an error value; and the neural network is adjusted based on the error value. The method may include generating the benchmark image based on a user defined image. The benchmark image may include a plurality of benchmark images, and the plurality of benchmark images may be sampled from a particular artistic style. The benchmark image may include a plurality of benchmark images, and the plurality of benchmark images may be sampled from images on a social media site which match predefined criteria.

According to a third series of embodiments a system is provided for image enhancement, including a processor, memory on which is stored the trained neural network of claim 7, and an application configured to process an input image using the trained neural network to generate the output value and modify the input image using the output value to generate an enhanced image. The processor of the system may be configured to download an updated trained neural network based on a defined criteria. The neural network may be configured such that the output value predicts a variance in a control parameter between the input image and the enhanced image.

In a fourth series of embodiments, a method of image processing includes providing a neural network configured to accept an input image and output a plurality of output values related to the input image; inputting the input image into the neural network so as to generate the plurality of output values for the input image; and modifying the input image using the plurality of output values to create an enhanced image. In one embodiment the neural network includes a plurality of first layers and a plurality of parameter heads connected to receive an output from the first layers, each of the plurality of parameter heads corresponding to one of the plurality of output values.

In a fifth series of embodiments a method is provided for training a neural network, including providing a neural network which includes a first layer portion, a first head downstream from the first layer portion, the first head outputting a first output value associated with a first control parameter, and a second head downstream from the first layer portion and in parallel with the first head, the second head outputting a second output value associated with a second control parameter. A plurality of first control parameter training images are input. For each of the plurality of first control parameter training images, the first layer portion is adjusted and the first head based on the first output value is generated by the first head as a result of the first control parameter training image. A plurality of second control parameter training images is provided. For each of the second control parameter training images, the second head based on the second output value, generated by the second head as a result of the second control parameter training image, is adjusted while leaving the first head and at least a portion of the first layer portion unadjusted or adjusting the first layer portion at a reduced learning rate in comparison with a learning rate of the second head.

According to a sixth series of embodiments a method of training a neural network includes providing a high resolution image and cropping a portion of the high resolution image to create a cropped image portion. Resolution of the high resolution image is reduced to create a lower resolution image. The cropped image portion is attached to the lower resolution image to create a benchmark image. A training image based on the benchmark image is processed through the neural network to generate an output. The neural network is adjusted based on the output from the training image.

BRIEF DESCRIPTION OF THE DRAWINGS

The foregoing and other purposes, aspects and advantages of the invention will be better understood from the following detailed description of an embodiment of the invention with reference to the drawings, in which:

FIG. 2A illustrates an exemplary training hardware system according to an embodiment of the invention;

FIG. 2B illustrates an exemplary inference hardware system according to an embodiment of the invention;

FIG. 3 illustrates an embodiment of training database generation;

FIG. 5 illustrates an embodiment which processes multiple control parameters;

FIG. 6E illustrates a second training iteration for the brightness head in the system of FIG. 6A;

FIG. 6F illustrates a third training iteration for the brightness head in the system of FIG. 6A;

FIG. 7A illustrates a simplified presentation of a neural network system according to an embodiment of the invention performing an inference operation on an input image;

FIG. 7B illustrates an example of image processing using the inference process on an input image according to an exemplary embodiment of the invention;

FIG. 9 illustrates an exemplary embodiment of the invention which allows a user to train the network to a particular style embodied in a selected image.

DETAILED DESCRIPTION OF EMBODIMENTS OF THE INVENTION

Figure 1A:
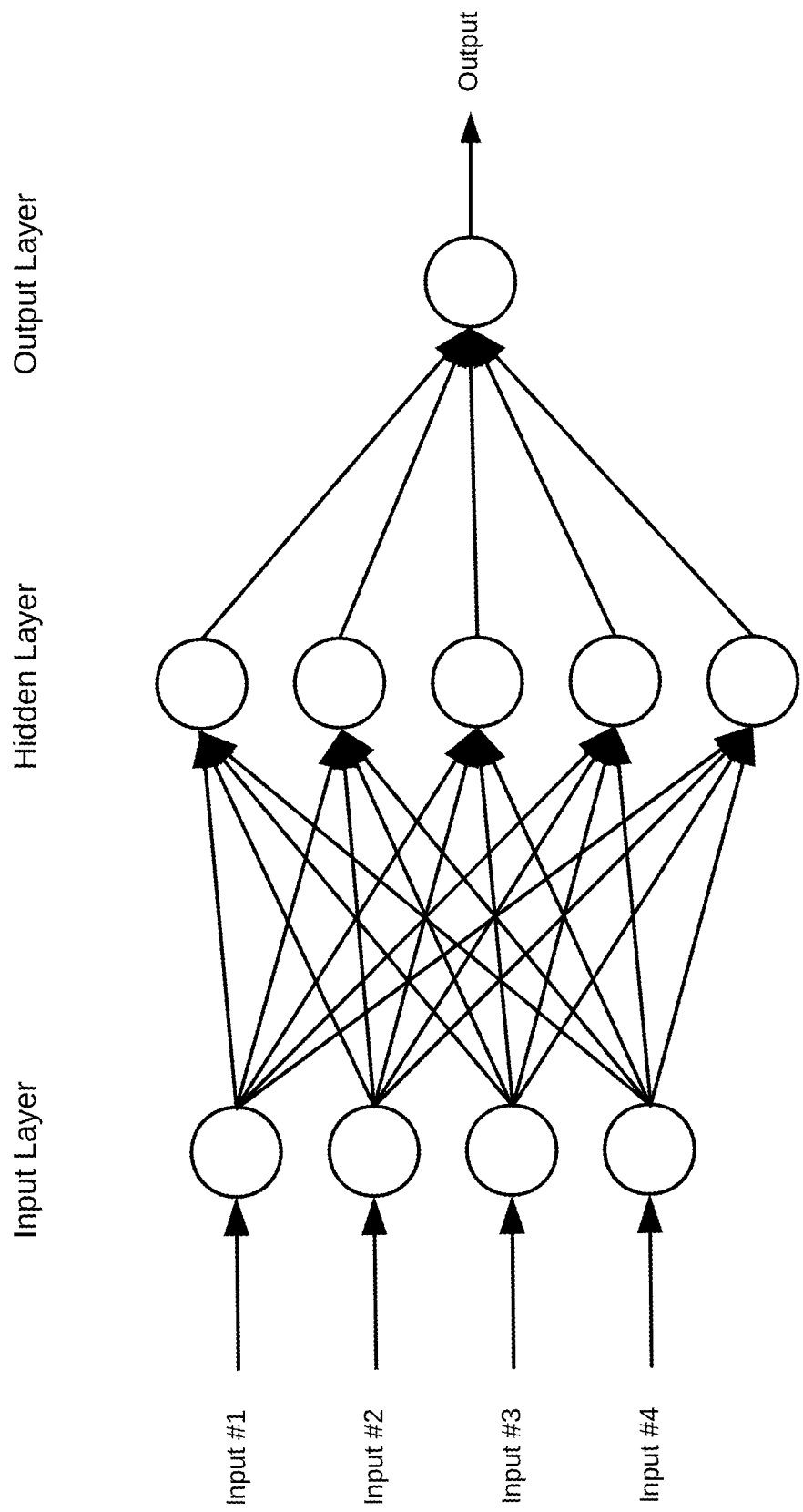
FIG. 1A illustrates an example of a multi-layer model.

With post-image acquisition processing performed on mobile camera devices, embodiments of the invention enable enhanced image aesthetics by estimating optimal parametric values for image enhancement. Estimates of these values may be optimally suited to user preferences.

By way of example, the range of controllable numerical parameters available for selecting optimal image processing enhancements include basic Auto White Balance, Brightness, Contrast, Saturation, Sharpening, and continue with more advanced adjustments such as HDR, Face Beautification parameters, Relighting and Bokeh. Values of these parameters can usually be fixed by the solution developer at development time, set by the user at usage time, or set by an autonomous system at user time. Advantageously, the first approach, using a set of fixed parameters may be chosen by a group of experts, e.g., professional photographers, but lacks flexibility. The second approach, letting the user set the optimal parametric values, addresses the flexibility problem, but may be best suited for the skilled photographer and not an inexperienced end user. A non-limiting list of possible parameter includes brightness, global contrast, local contrast, sharpness, blur, denoise strength, saturation, tint, color temperature, parametric transformation, linear piece-wise transformation, tone compression, and various face beautification parameters. The face beautification parameters may include skin smoothing, skin sharpening, toning, face slimming, nose slimming, eye enlargement, eye enrichment, eye circles, 3D look, spots removal, spotlight, lips perfection, blush, teeth whitening, and eye brightening.

A third approach, using an autonomous system for setting optimal parametric values, provides flexibility without requiring that the user possess a high level of experience in adjusting parametric values. In the past, most or all of these autonomous systems have used simple decision algorithms without awareness of the content of the particular image to be processed or the types of parametric adjustments needed to improve quality of the particular image.

An exemplary aspect of the invention applies to a system to predict a parameter which may be used to modify the input image into an optimal form thereof. In particular, a neural network is trained to predict the amount one or more parameters are "off" from an idealized version of the user input original image. By so doing, each parameter can then be used to modify the original user image (for example, by an inverse arithmetic function) to generate an enhanced image.

Given that Machine Learning is a tool for finding a mathematical approximation for a function that describes a certain phenomenon, exemplary embodiments of the invention provide a function that receives as an input an image representation and outputs an optimum set of control parameters that can be used in an image processing tool to obtain the best version of the input image:

$$\text{net}([x_1, x_2, \ldots x_n] | [w_1, w_2, \ldots w_m]) = [y_1, y_2, \ldots, y_3],$$

where: net is a mathematical function controlled by some internal parameters $[w_1, w_2, \ldots w_m]$; $[x_1, x_2, \ldots x_m]$ is the set of pixels belonging to the input image; and $[y_1, y_2, \ldots y_m]$ is the set of control parameters that if used in an image processing tool, will enhance the input image.

The network architecture is basically a description of the mathematical function net. The complexity of the function can vary from very simple functions to enormous models that are impossible to be written on paper. For example, a very simple model, having a linear function for 1D input size:

$$y_1 = w_1 * x_1 + w_2$$

For a very simple model, having a linear function for N-D input size:

$$y_1 = w_1 * x_1 + w_2 * x_2 + \ldots + w_N * x_N + w_{N+1}$$

Another example can be seen in FIG. 1A, which illustrates an example of a multi-layer model, called a Multi-Layer Perceptron. Every node in FIG. 1A is defined by the previous equation to compute a linear combination of the inputs.

Figure 1B:
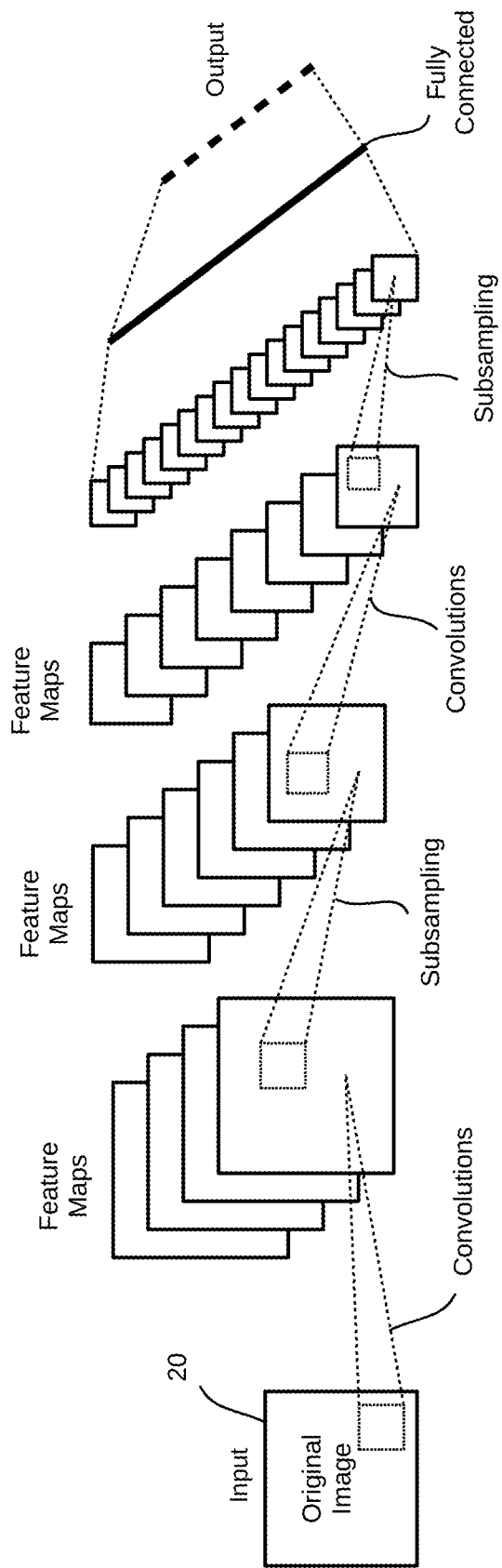
FIG. 1B illustrates and example of network architecture which includes a cascade of multiple convolution filters.

The size of a network is given by the numbers of parameters $w_N$. The larger a network is, the more complex the functions it can model. The architecture of a network is a description of the inputs are mathematically combined with parameters in order to obtain a desired result. There are a few building blocks in defining the architecture (e.g., convolutions, downsamples, activation functions) of such a network. The architectures are often so large and complex that they can model a very large set of phenomena, given the right set of function parameters ($w_i$). An approach commonly used in computer vision applications defines the network architecture as a cascade of multiple convolution filters. See FIG. 1B.

With Machine Learning training tasked with finding a set of values for parameters $w_i$ that gives the best approximation of a desired function, to find these parameters one uses a set of input images $\{X_1, X_2, \ldots, X_P\}$ and its corresponding outputs $\{Y_1, Y_2, \ldots, Y_P\}$. The pairs of input images and desired outputs are presented to the network and the network parameters are continuously adjusted in order to minimize the difference between the desired output and the output given by the network, referred to as a loss function or error.

The loss function can be the sum of absolute differences between the parameters predicted by the network, when an altered image is the input, and the real value of the parameter that was used to obtain the altered image.

After the training process is finished (e.g., the error is small enough, or the error is not decreasing anymore, or there is no more time left for training), the obtained network/function parameters are fixed and deployed on the device to be used. This provides a mathematical function defined by a certain architecture and a set of parameter values that, when an image is presented as an input, the output is a predicted value of the parameter that was used to obtain the image, e.g., the input image is an altered image derived from a perfect looking image.

Figure 1C:
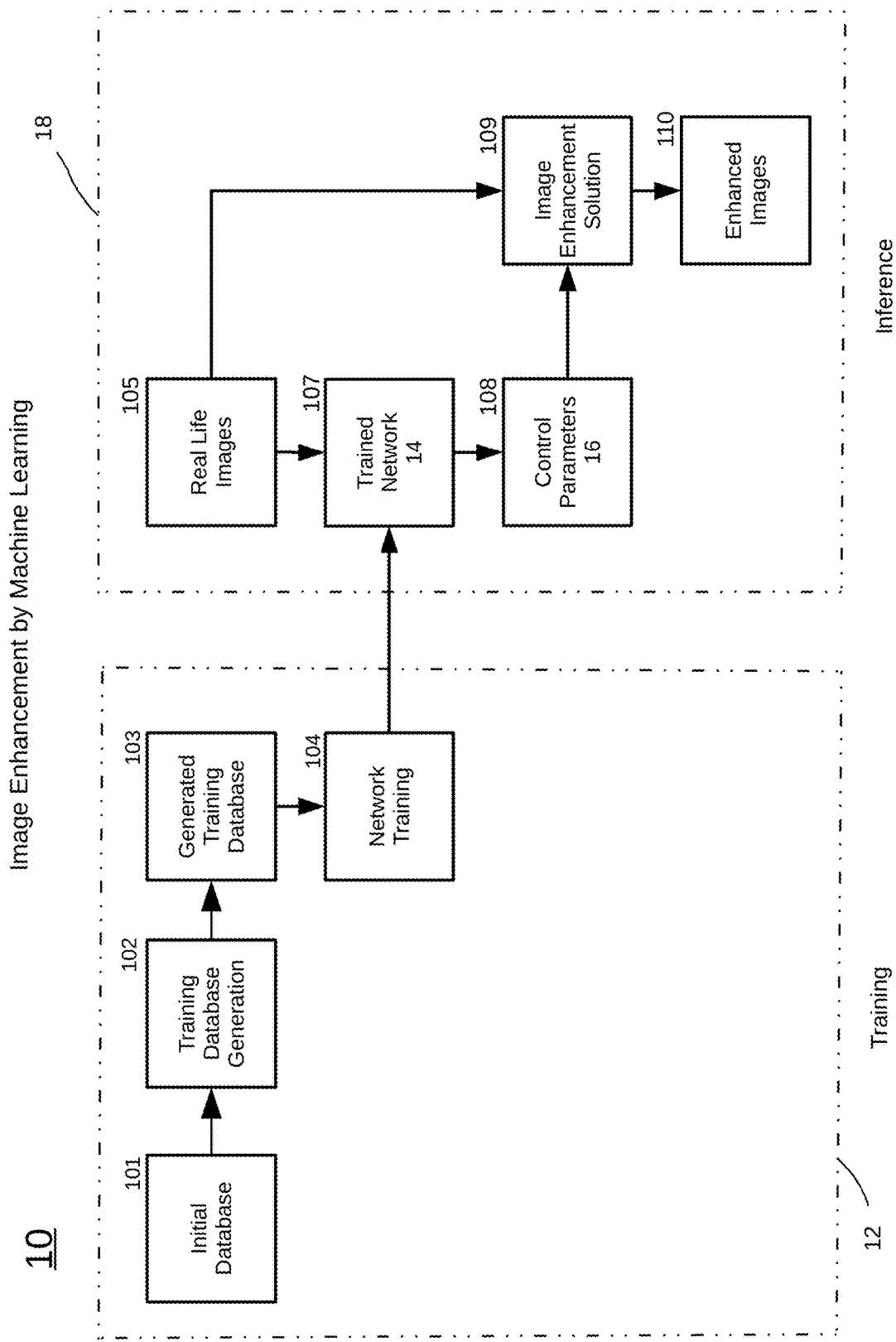
FIG. 1C illustrates an exemplary embodiment of the invention showing an image enhancement system using machine learning.

Embodiments of the invention provide an intelligent system for efficiently estimating optimal parameter values for image processing solutions. FIG. 1C presents an exemplary end-to-end workflow (in steps 101 to 110) for an IE process 10 having a training stage 12 which occurs during a ML development period, resulting in a trained neural network 14. The neural network 14 is trained to estimate optimal values of control parameters 16 for future image acquisitions in a separate and distinct inference stage 18. The inference stage 18 receives raw data of an original image 20 and applies a version of the trained neural network 14 received from the training stage 12. The processing generates adjustments to parametric values of the image to be enhanced which adjustments are predictive of a more optimally aesthetic version of the image. That is, a set of parametric values are generated, which when used in an IE system, generate a more optimally aesthetic version of the image."

FIG. 2a and FIG. 2b illustrate an exemplary system 28 on which the training stage 12 and the inference stage 18 are performed. The system 28 comprises a computer system 30 (e.g., a cloud-based server), comprising a main processor 32, memory 34, server storage 36 on which the neural network 14 is trained. The system 28 also includes a hand-held mobile communications device 46 on which the inference stage 18 is executed. The illustrated exemplary hand-held mobile communications device 46 is a camera phone 50, comprising an image acquisition device 54, an image processor (IP) 58, a processor 60 (IP, CPU, etc.) and phone memory 34', storage 36', a neural network processing module 64, and a transceiver (not shown) providing mobile communications capabilities, including a rf linkage to receive, over a communications network 70, the trained neural network 14 into the neural network module 64 in the device 46.

The training stage 12 begins with a set of benchmark images 74, e.g., enhanced images selected because they meet criteria for high quality, aesthetically pleasant images. These may, but need not, be obtained from professional photographers. The ideal images can be of multiple styles (e.g., portrait, landscape, etc.) and can reflect a particular trend, artistic theory, or generally be considered of professional quality. In any event, these images will be of the desired quality to generate an initial database of images used in a training operation for the neural network training module 40 is based on an initial database 78 comprising the benchmark images 74 (which may be considered "relatively perfect" looking images in the training process), and a series of less perfect images 80 (e.g., degraded versions of the benchmark images in database 74).

Referring again to the end-to-end workflow of FIG. 1C (steps 101 to 110), the Initial Database (101) goes through a process referred to as Training Database Generation (102) that generates the less than perfect images 80 (103), referred to as the Generated Training Database 84. FIGS. 2A and 3 describe the Training Database Generation process. The benchmark images 74 are modified by adjusting one or multiple control parameter values, such as brightness, contrast, skin smoothness, etc. A control parameter, such as brightness, is modified by a desired value, or a random value, and the benchmark image 74 is then adjusted by this modified control value to generate a training image, or less than perfect image 80. Multiple training images 80 may be created for each benchmark image for each parameter to be trained through the neural network.

The combination of benchmark images 74 and less than perfect images 80 is used in the neural network training module 40 which performs Network Training (104) to identify a set of optimal neural network weights suitable for predicting adjustments to parametric values. The adjusted weights are embodied in the trained neural network 14, which final output of the Network Training Stage (104) is downloaded from the computer system 30 into the neural network module 64 of the device 46 for predicting adjustments to new (original) images 20 (also referred to as Real Life Images), acquired (105) with the image acquisition device 54 or otherwise stored in phone memory 34' or phone storage 36'.

During the Inference Stage, the images 20 are processed (106) through the trained neural network 14 resident in the neural network module 64 in order to obtain optimal values of the control parameters 16 (107). These parameters 16 are used to control the Image Enhancement Solutions (109) and obtain the final Enhanced Image (110). The IP/CPU 60 then processes the original image 20 accordingly to obtain a modified version 22 of the original image 20, predicted to be more acceptable to the user or based on other criteria. See FIG. 7.

A simplified, exemplary methodology according to the invention may include the following Training and Inference (Prediction) Steps:

Training
1. Provide Benchmark Image
2. Generate First Modified Value $FMV_i$ for a parameter $P_i$
3. Modify a parameter $P_i$ of the Benchmark image with $FMV_i$ to generate a training image
4. Input training image into NN
5. Output Adjustment Value ($AV_i$)
6. Calculate Error between $FMV_i$ and $AV_i$
7. Adjust NN based on Error Value Prediction
8. Provide Input image to be improved
9. Input image into NN
10. generate Output Value from NN
11. take an additive inverse (or other type of inverse) of the output value to generate a corrected parameter value (Adjustment Parameter Value)
12. modify input image with the corrected parameter value to generate an improved image.

While the embodiments are described with convolutional neural networks, generally the invention contemplates using any type of neural network (e.g., standard convolutional, MultiLayer Perceptron or other) and using any form of appropriate adjustment mechanism for the neural network, such as back propagation for adjusting weighting factors.

To further describe the process, FIG. 3 illustrates a series of steps 2.1 to 2.5 in the Training Database Generation stage (1.2) which begins with an above-referenced initial database 78 (1.1), (2.1), comprising the benchmark images 74—images having a common desirable feature. Images 74 in the initial database may all meet criteria indicative of generically good-looking images, if the goal of the system is to generate generically good looking images; or the images may all have been created by a certain photographer, if the goal is to generate a series of enhanced images all replicating the style that photographer. By incorporating a large variety of image categories (e.g. landscapes, food pictures, portraits, photographs of urban streets, etc.) the network can be trained to better adapt to a wider selection of use cases.

One or a set of Image Enhancement Solutions (2.2) are used to alter the Initial Database (1.1), (2.1) to create a series of images 80, which may be degraded versions of the benchmark images 74, provided as different examples for the training process.

The benchmark images 74 and the less than perfect images 80 are used in the neural network training module 40 to perform Network Training (104) that identifies a set of optimal neural network weights suitable for predicting adjustments to parametric values. The adjusted values are embodied in the trained neural network 14.

Referring to FIGS. 1C and 3, the Trained Neural Network 14, resulting from Network Training with the combination of benchmark images 74 and the less than perfect images 80, generates a solution used during Inference Stage (18) to enhance new images. The choice for the Image Enhancement Solution 2.2 (Step 109) is flexible based on desired aesthetic effects. The same end-to-end workflow of FIG. 1 will work for any solution, e.g., starting with a small number of control parameters 16 such as Brightness Enhancement, Contrast Enhancement, Saturation, Sharpening, or covering more complex parameters controlling Face Beautification.

The Image Enhancement Solution (2.2) is based on selection of the control parameters 16 (1.7, 2.2) and determination of parameter values (1.7). These are determinative of how the Neural Network will predict an enhancement of a newly presented image, i.e., how the enhancement of the newly presented image will look aesthetically. They correspond to the same parameters for which the Neural Network will learn to predict values. In one embodiment, during the Training Database Generation (102) the values of the chosen control parameters are randomly selected using a Pseudo Random Number Generator (2.4).

Each of the images from the Initial Database 78 (2.1) is individually processed multiple times (N) with different parameter values to obtain different image enhancements or interpretations. The processed versions and the associated values of the corresponding control parameters 16 form the Generated Training Database (103, 80) and are stored and used during the Neural Network Training (104) process.

An exemplary training process in accordance with classical network training follows:

Step 1. Present an image X as an input to the network defined by weights W.

Step 2. Forward propagate the image to the network to obtain the output value Y.

Step 3. Compute the error between the network output value Y and the true label of the data value Y, using a certain Loss Function.

Step 4. Back-propagate the error's gradients to the network and update the weights.

Step 5. Repeat Steps 1-4 for each of the images 80 added in Database Creation (102)

In the above process, X represents an image or a batch of images from Generated Training Database (103) and Y represents values of the corresponding control parameters 16 (108) used to obtain the image.

For the illustrated embodiment, the images presented as an input to the network may each be a downscaled version of the initial (original) image 74 or 20 to facilitate higher speed processing speeds during both training and inference stages. This can advantageously limit the network size requirements and processing time, e.g., for mobile applications. The system has been so demonstrated with low resolution fixed image sizes on the order of 300×300 pixels). Selection of image resolution is discretionary in accord with the application and hardware specifications. However, the Image Enhancement Solution (109) may require presentation of higher frequency details (e.g., applying skin smoothing or skin sharpening adjustments). When these properties are not observable due to downscale processing, enhancement of such characteristics can be obtained despite this limitation with embodiments that incorporate full resolution crops of pertinent portions, or random portions, of the image (along with the downscaled version of the image). With the higher resolution crops the ML network is able to process and enhance the higher frequency details. There are multiple approaches for selecting higher resolution crops. These include random selections and guided selections (e.g., based on facial landmarks chosen to identify relevant regions of the face). The specific Loss Function selected to compute the error is not critical to the described system. Use of both L1 Loss and L2 Loss functions were successfully demonstrated with the system.

Network Architecture implementation of the disclosed workflow is not limited to any specific Neural Network architecture. A typical approach may use a convolutional neural network, as these networks have demonstrated capabilities for capturing relevant details for image enhancements. Several such architectures have been proven to provide good results. These include AlexNet, Inception V3, MobileNet. The image of FIG. 3 illustrates a typical convolutional neural network. Attribution: Aphex34. Licensed under the Creative Commons Attribution-Share Alike 4.0 International license. See commons.wikimedia.org/wiki/File:Typical_cnn.png.

Figure 4:
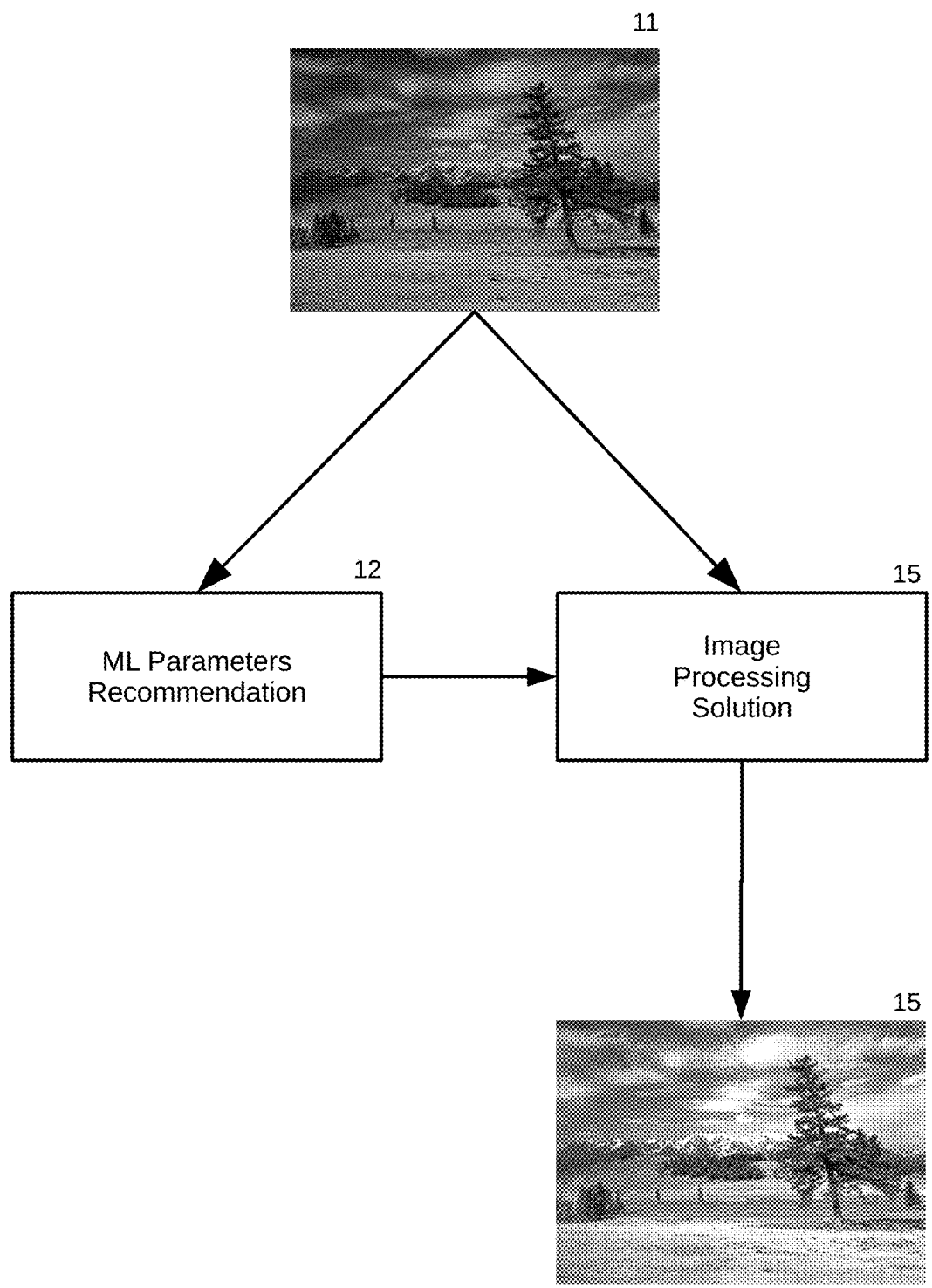
FIG. 4 illustrates an approach for the simple case of estimating two parameters, each with a separate network.

A process for learning a larger set of parameters may train a different instance of the network for every parameter (or at least for sub-sets of parameters). However, this approach does not exploit the common knowledge shared by the various instances of the networks. This results in relatively large computation times. That is, in the inference stage, in training a different instance of the network for each parameter, the same image is passed through multiple networks. FIG. 4 illustrates such an approach for the simple case of estimating two parameters, each with a separate network.

According to the embodiment shown in FIG. 5, a more efficient process and architecture involve a single network which trains multiple parameters, represented as three different "parameter heads", it being understood the number of parameter heads for each parameter may vary. Each of the exemplary parameter heads is a convolutional neural network which trains one parameter type, i.e., a specific type of parameter or set of parameters, such as HDR parameters. During the training process, the first layers L1-L5 of the network shown in FIG. 5 are trained together with the first chosen parameter type $PH_1$. after the initial training, when the other parameter types are trained, the first layers L1-L5 are kept fixed or are trained with a much lower learning rate while only one of the remaining parameter heads, for example $PH_2$, is trained. The approach is workable because the first layers L1-L5 of the network learn general features of the image, which are relevant for all of the other sets of parameters heads (e.g., PH$_2$-PH$_3$).

A step by step illustration of the training process is illustrated in FIGS. 6a-6h. For the purposes of this description, the neural network and weighting value examples are simplified to facilitate understanding of the underlying concepts. The first layers are labeled Conv11, with the weight of Conv11 being represented as W11. Note that the weighting value of W11 is representative only. In practice there may be multiple weighting values for the first layer, or W11 may merely represent one of a plurality of weighted values of first layers Conv11. The parameter head for brightness (a first control parameter) is labeled FC_Bright, with the weight of FC_Bright being labeled W21. Similarly, the parameter head for contrast (a second control parameter) is labeled as FC_Contrst with its weight being labeled W22.

For the examples of FIG. 6, initially W11=0.14, W21=0.29 and W22=0.32. To begin training, in FIG. 6a, a first training image is entered into the neural network. This first training image has had its brightness adjusted by a value of 50 from the benchmark (original/ideal) image. The output of the brightness parameter head is −32, while the contrast parameter head output is +15. As shown in FIG. 6b, because the contrast parameter head is not being trained at this point (and the image has not had its contrast adjusted/degraded from the benchmark), the contrast parameter head output is ignored or, alternatively, the parameter head may not even be processed, depending on the design of the neural network. As shown in FIG. 6c, the output of the FC_Bright is compared to the modified parameter value (the value by with the training image was modified). This generates the error value. In this case, the error value is 18. The error value 18 is then used to adjust the neural network. In the example shown in FIG. 6d, the error value is used to back propagate through FC_Bright and Conv11 so as to adjust the weighting values of these portions of the neural network. In this iteration, after backpropagation, W11=0.25 and W21=0.29.

This process then repeats as shown in FIG. 6e, the next training image, having a modification value of 30 for brightness, is input into the neural network. The output of FC_Bright is +15, with an error value of 15. This value is back propagated through FC_Bright and Conv11, which adjusts W11 to 0.25 and W21 to 0.35.

The process repeats again in FIG. 6f, with a training image having a brightness modified value of −25. This results in an output of −20 from FC_Bright, which results in an error value of 15. The result is back propagated which results in W11=0.28 and W21=0.37.

Figure 6A:
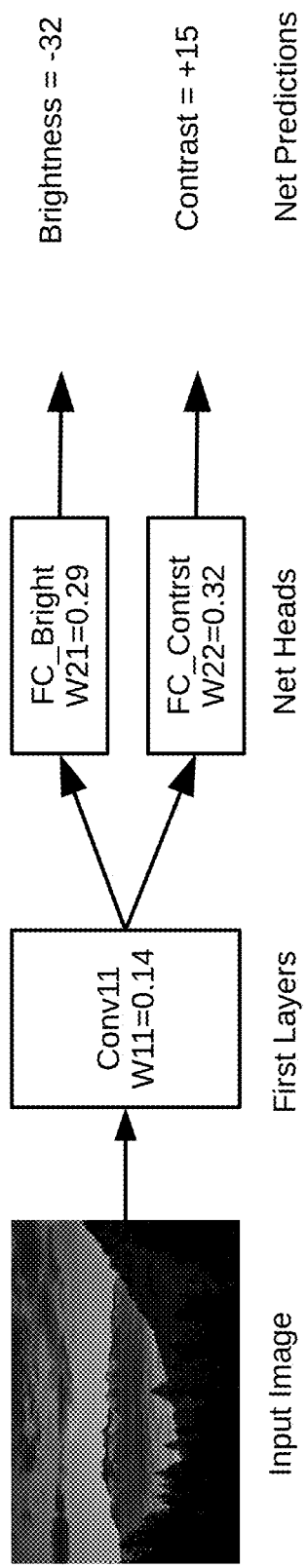
FIG. 6A illustrates a simplified presentation of a neural network system according to an embodiment of the invention.
Figure 6B:
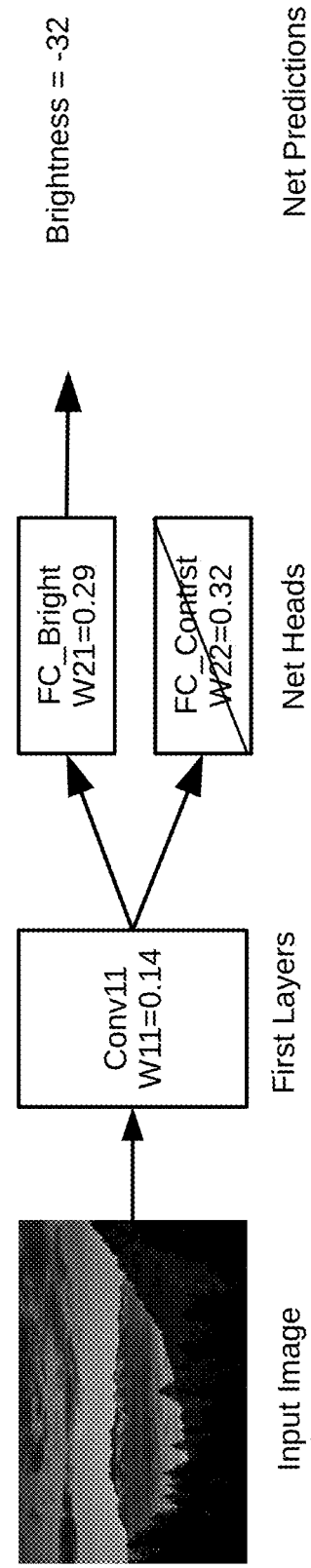
FIG. 6B illustrates an exemplary step processing an image using the brightness head in the system of FIG. 6A.
Figure 6C:
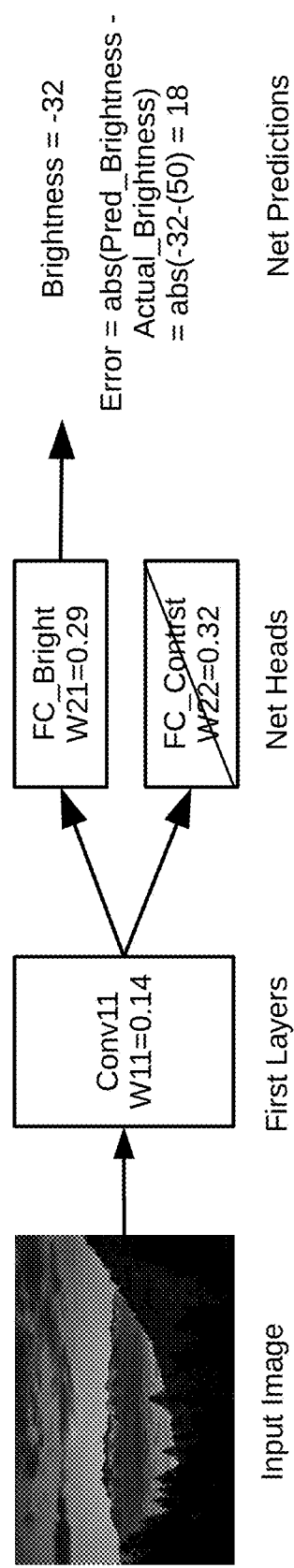
FIG. 6C illustrates an exemplary step in computing the error during training of the brightness head in the system of FIG. 6A.
Figure 6D:
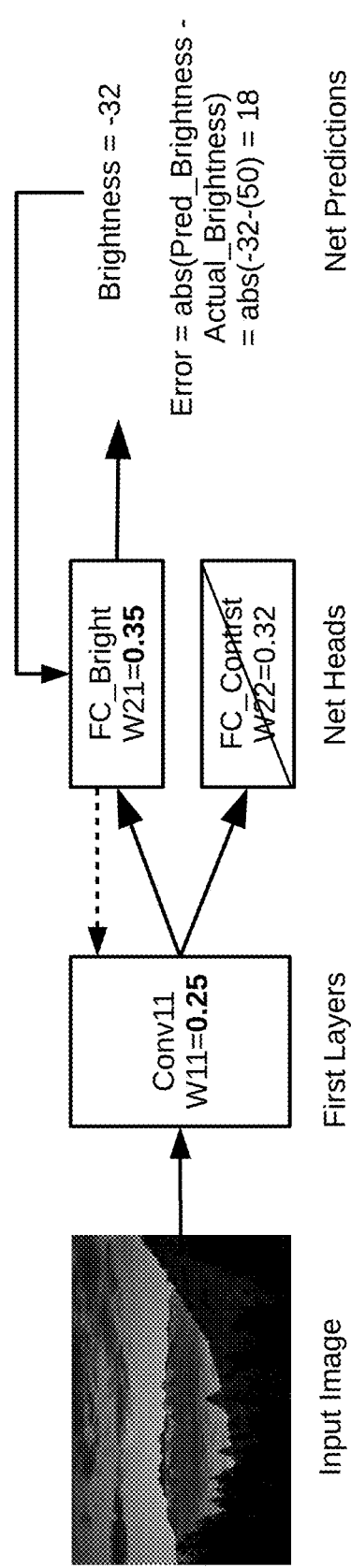
FIG. 6D illustrates an exemplary network training step through back propagation in the system of FIG. 6A.
Figures 6G, 6H:
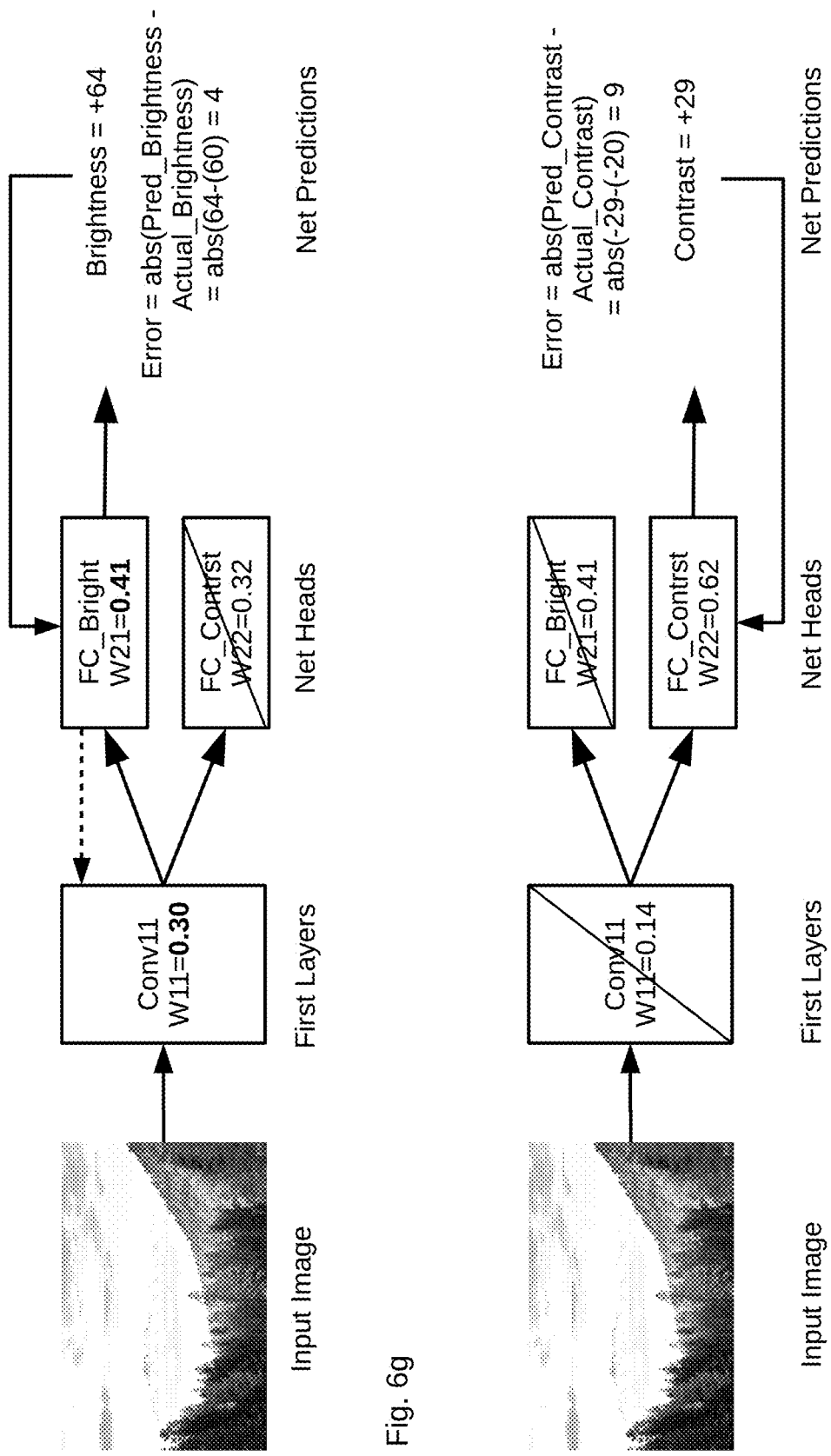
FIG. 6G illustrates a fourth training iteration for the brightness head in the system of FIG. 6A.
FIGS. 6H and 6I illustrate a first training iteration for the contrast head of system 6A.
Figure 6I:
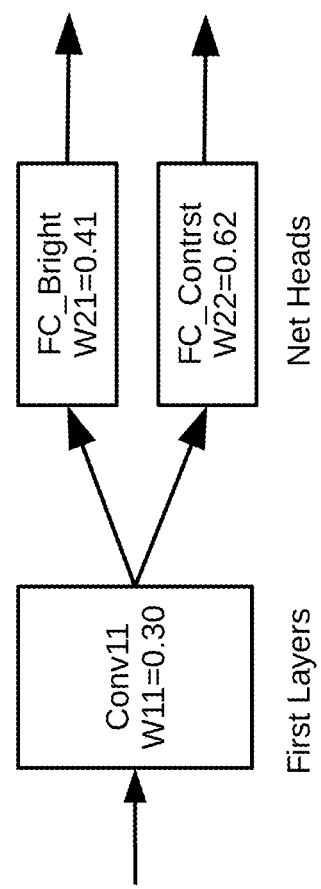

FIG. 6g shows the final step in the training of the first control parameter. An image with a brightness modified value of 60 results in the output of FC_Bright=+64. The error value is calculated as 4, which is back propagated through FC_Bright and result in Conv11 for W11=0.30 and W21=0.41.

The training of the second control parameter begins in FIG. 6h. As can be seen by the diagonal lines in Conv11 and FC_Bright, in this instance, both of these weight values will be fixed and not altered through any back propagation. In this step, a training image having contrast modified by +20 is input into the neural network. The output of FC_Contrst is +29. This is compared with the modified parameter value for contrast (+20) to generate an error value of 9. This error value is used to adjust the parameter head associated with contrast, FC_Contrst, though back propagation. In this case, W22 is changed to 0.62, while W11 and W21 are both not changed, as they are fixed at this point. Training of FC_Contrst will continue iteratively, as was done for FC_Bright, except that during back propagation the first layers of the neural network, Conv11, will not be altered. The training of any additional parameters will be handled the same way as FC_Contrst.

The multiple parameter value neural network can be used similarly to the previous embodiment. As illustrated in FIGS. 7a and 7b, an original image (105) is input into the trained neural network (107). The outputs of FC_Bright=−30 and the output of FC_Contrst=−70 are generated. The arithmetic inverse of these outputs are taken and then input, along with the original image (105) into the image enhancement solution (109). Using the values (+30 to brightness and +70 to contrast) to modify the original images (105), the image enhancement solution (109) generates enhanced images (110).

A simplified exemplary embodiment of the invention corresponds to the following set of steps, including:
1. Generate N sets $S_j$ of image frame data, each set derived from a group of original images by modifying a value, $V_i$, of one parameter $P_i$ in a group of parameters to a first modified value, $FMV_i$;
2. Provide a convolutional NN comprising a plurality of first layers L and a head parameter layer HPL, comprising a Parameter Head $H_i$ for each parameter $P_i$, connected to receive an output from the first layers, each Parameter Head associated with one in the group of parameters and configured to generate as an output an Adjusted Value, $AV_i$, in response to the first modified value of said one in the group of parameters.
3. Input $FMV_i$, for said one in the group of parameters to the NN, and generate the value $AV_i$ in response thereto.
4. Determine an error, $E_i$, by comparing the value $FMV_i$ with the value $AV_i$ generated as a response thereto for $P_i$.
5a. If i=1, perform back propagation for the parameter $P_i$ with the error $E_i$ to modify weights in the Parameter Head $H_i$ associated with $P_i$ and in the first layers L.
5b. If i>1, perform back propagation for the parameter $P_i$ with the error $E_i$ to modify weights in the Parameter Head $H_i$ associated with $P_i$.
6, If $E_i$>Thresh, increment i; Go To 3. Otherwise, go to 7.
7. If $E_i$<Thresh, increment j; If J<N, reset i to 1 and go to Step 3. Otherwise END.

Figure 8:
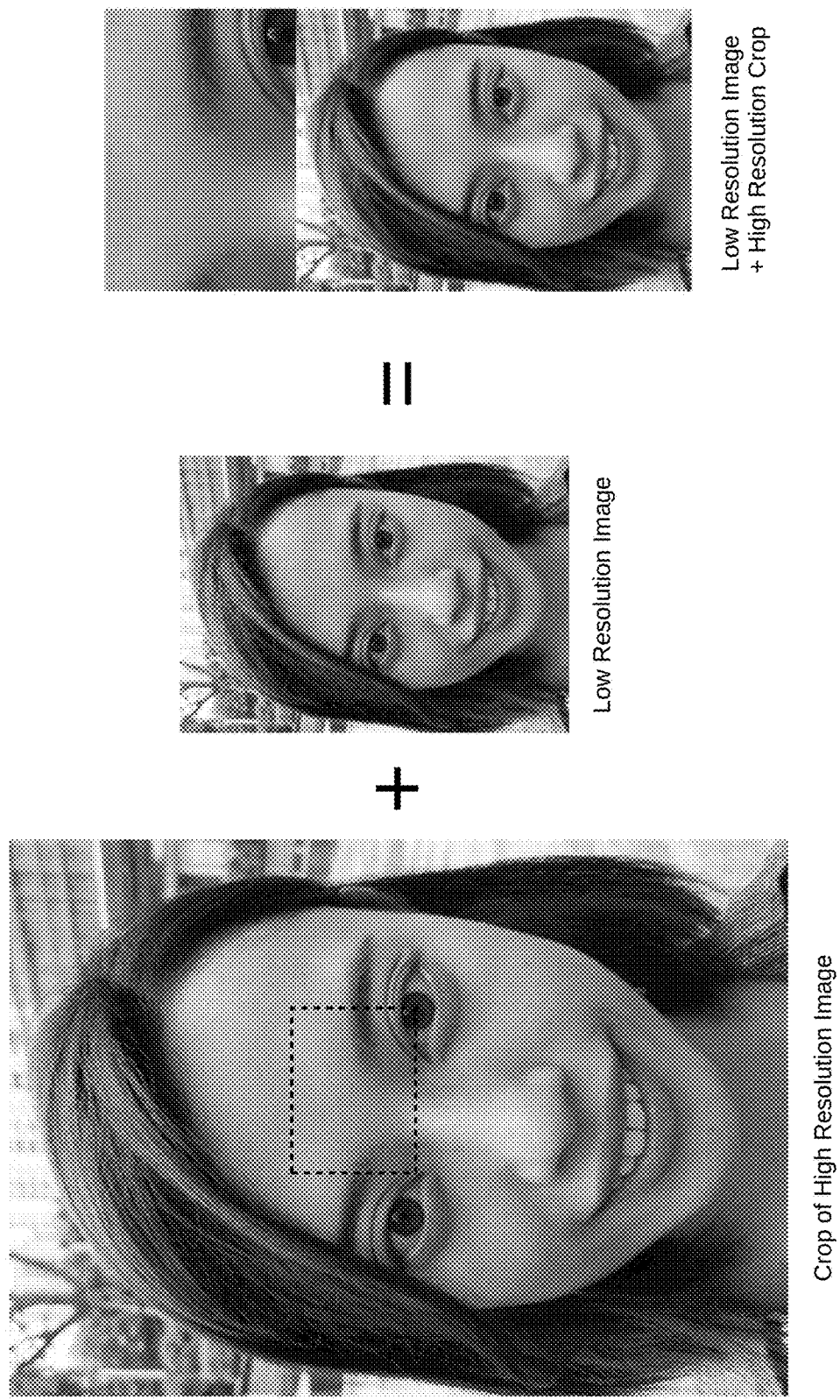
FIG. 8 illustrates an exemplary embodiment of the invention where which allows training of high resolution features.

Another exemplary embodiment is illustrated in FIG. 8. In this embodiment, a higher resolution image has a cropped portion copied. The higher resolution image is then reduced to a lower resolution image. The lower resolution image then has the cropped portion added to it to create a composite image. This provides a lower resolution image than the original, which still having a higher resolution portion available to train portions of the neural network which require higher resolutions to train. An example would be skin smoothing control parameters. Normally, these require high resolution images to be effectively trained. However, attempting to train an entire neural network will all high resolution images greatly increases the processing required. Having a portion of the composite image at a higher resolution, to capture feature details from the original high resolution image, enables efficient training of pertinent parameters of the network.

Another embodiment of the invention considers the ability to adapt the neural network to meet certain user preferences. For instance, the neural network may be tuned or altered by inputting images of a particular style to bias the predicted adjustments to the original image. An example of this would be sourcing benchmark images from the cloud for a certain year to adjust for current styles or fashions. These can be obtained from a particular source as a "style" package, or can be sourced from popular images online, such as from a social network.

In yet another embodiment, the user will have an option to train the neural network based on one or on a few images in order to have the system generate a certain look embodied in the supplied image. For instance, FIG. 9 illustrates a photo taken from a popular fashion magazine. This image would then be trained into the neural network to bias the prediction and image enhancement to produce enhanced image which more closely emulate the example picture. This may be accomplished through increased iterations using the same image in training, or with custom weighting of the image. Based on the knowledge gathered during Network Training 104, the network predicts values for sets of control parameters (108). Given the afore described training process, the values of these control parameters are modified to alter benchmark images 74, e.g., perfect looking images, to look more like original images 20 (e.g., not professionally enhanced). The exemplary modifications that degrade the aesthetic quality of the images 74 are additive transformations.

Again referring to FIG. 1, during the inference stage 18 a new image (Real Life Image) 20 (105) is presented as an input to the Trained Network (107). Each new (original) image 20 presented as an input (105) in the Inference Stage 18 is not a perfect looking image. Rather, it is regular image which can be enhanced in the Inference Stage 18. According to an embodiment of the invention, one can apply an inverse of the transformation developed by Network Training 1.4 to degrade the aesthetic quality of the images 74. This brings new (original) images 20 closer to the perfection. That is, the inverse of each additive change developed in the training stage 12, in the transformation of parameter values, is applied to control the Image Enhancement Solution (109) in the Inference Stage 18.

Embodiments of a methodology have been described which enable improvements in optimizing image quality. Advantageously, the embodiments reduce processing time and enable application of neural networks to mobile applications. Example embodiments of the invention have been illustrated, but the invention is not so limited. Accordingly, the scope of the invention is only limited by the claims which follow with each claim constituting a separate embodiment. Embodiments may combine different claims. Combinations of different embodiments are within the scope of the claims and will be apparent to those of ordinary skill in the art after reviewing this disclosure.

The claimed invention is:

1. A method of training a neural network, the method comprising:
    providing the neural network, the neural network comprising:
        a layer;
        a first head downstream from the layer, the first head outputting a first output value associated with a first control parameter; and
        a second head downstream from the layer and in parallel with the first head, the second head outputting a second output value associated with a second control parameter;
    inputting first control parameter training images into the layer of the neural network;
    receiving the first output value from the first head;
    comparing the first output value and a first modified parameter value associated with at least one of the first control parameter training images;
    generating, based at least in part on the comparing, a first control parameter error value;
    adjusting the layer and the first head based at least in part on the first control parameter error value;
    inputting second control parameter training images into the neural network;
    receiving the second output value from the second head;
    comparing the second output value and a second modified parameter value associated with at least one of the second control parameter training images;
    generating, based at least in part on the comparing, a second control parameter error value; and
    adjusting the second head based at least in part on the second control parameter error value.

2. The method according to claim 1, further comprising:
    determining a first learning rate associated with the first head; and
    determining a second learning rate associated with the second head, the second learning rate different from the first learning rate,
    wherein the layer or the first head is adjusted based at least in part on the first learning rate and the second head is adjusted based at least in part on the second learning rate.

3. The method according to claim 1, wherein adjusting the second head comprises adjusting the second head while not adjusting at least a portion of the layer or the first head.

4. The method according to claim 1, wherein the first control parameter is an inverse of the first modified parameter value.

5. The method according to claim 1, wherein the first control parameter or the second control parameter comprises at least one of: brightness, contrast, saturation, sharpness, blur, denoise strength, tint, color temperature, parametric transformation, linear piece-wise transformation, tone compression, or a face beautification parameter.

6. The method according to claim 1, further comprising:
    providing a trained neural network based at least in part on adjusting the layer, adjusting the first head, or adjusting the second head; and
    enhancing an image input into the trained neural network.

7. The method according to claim 1, wherein the first head or the second head represents a convolutional neural network.

8. The method according to claim 1, further comprising:
    training the neural network based at least in part on adjusting the first head and adjusting the second head; and
    providing the trained neural network as a service over a network.

9. A system comprising:
    one or more processors;
    memory storing instructions that, when executed by the one or more processors, causes the system to perform operations comprising:
        providing a neural network, the neural network comprising:
            a layer;
            a first head downstream from the layer, the first head outputting a first output value associated with a first control parameter; and
            a second head downstream from the layer and in parallel with the first head, the second head outputting a second output value associated with a second control parameter;
        inputting first control parameter training images into the layer of the neural network;

receiving the first output value from the first head;
comparing the first output value and a first modified parameter value associated with at least one of the first control parameter training images;
generating, based at least in part on the comparing, a first control parameter error value;
adjusting the layer and the first head based at least in part on the first control parameter error value;
inputting second control parameter training images into the neural network;
receiving the second output value from the second head;
comparing the second output value and a second modified parameter value associated with at least one of the second control parameter training images;
generating, based at least in part on the comparing, a second control parameter error value; and
adjusting the second head based at least in part on the second control parameter error value.

10. The system according to claim 9, the operations further comprising:
determining a first learning rate associated with the first head; and
determining a second learning rate associated with the second head, the second learning rate different from the first learning rate,
wherein the layer or the first head is adjusted based at least in part on the first learning rate and the second head is adjusted based at least in part on the second learning rate.

11. The system according to claim 9, wherein adjusting the second head comprises adjusting the second head while not adjusting at least a portion of the layer or the first head.

12. The system according to claim 9, wherein the first control parameter or the second control parameter comprises at least one of: brightness, contrast, saturation, sharpness, blur, denoise strength, tint, color temperature, parametric transformation, linear piece-wise transformation, tone compression, or a face beautification parameter.

13. The system according to claim 9, the operations further comprising:
providing a trained neural network based at least in part on adjusting the layer, adjusting the first head, or adjusting the second head; and
enhancing an image input into the trained neural network.

14. The method according to claim 1, wherein the at least one of the first control parameter training images is based at least in part on an image defined by a user.

15. The method according to claim 1, wherein the at least one of the first control parameter training images is based at least in part on an image comprising an artistic style.

16. The method according to claim 1, wherein the layer is a first layer, the neural network comprises a second layer, and further comprising inputting an output of the second layer into the first head.

17. The system according to claim 9, wherein the first control parameter is an inverse of the first modified parameter value.

18. The system according to claim 9, wherein the at least one of the first control parameter training images is based at least in part on an image defined by a user.

19. The system according to claim 9, wherein the at least one of the first control parameter training images is based at least in part on an image comprising an artistic style.

20. The system according to claim 9, wherein the layer is a first layer, the neural network comprises a second layer, and further comprising inputting an output of the second layer into the first head.

21. A device comprising: one or more processors; memory storing device instructions that, when executed by the one or more processors, causes the device to perform operations comprising:
providing a neural network, the neural network comprising:
a layer;
a first head downstream from the layer, the first head outputting a first output value associated with a first control parameter; and
a second head downstream from the layer and in parallel with the first head, the second head outputting a second output value associated with a second control parameter;
inputting first control parameter training images into the layer of the neural network;
receiving the first output value from the first head;
comparing the first output value and a first modified parameter value associated with at least one of the first control parameter training images;
generating, based at least in part on the comparing, a first control parameter error value;
adjusting the layer and the first head based at least in part on the first control parameter error value;
inputting second control parameter training images into the neural network;
receiving the second output value from the second head;
comparing the second output value and a second modified parameter value associated with at least one of the second control parameter training images;
generating, based at least in part on the comparing, a second control parameter error value; and
adjusting the second head based at least in part on the second control parameter error value.

22. The device according to claim 21, the operations further comprising:
determining a first learning rate associated with the first head; and
determining a second learning rate associated with the second head, the second learning rate different from the first learning rate,
wherein the layer or the first head is adjusted based at least in part on the first learning rate and the second head is adjusted based at least in part on the second learning rate.

23. The device according to claim 21, wherein adjusting the second head comprises adjusting the second head while not adjusting at least a portion of the layer or the first head.

24. The device according to claim 21, wherein the first control parameter is an inverse of the first modified parameter value.

25. The device according to claim 21, wherein the first control parameter or the second control parameter comprises at least one of: brightness, contrast, saturation, sharpness, blur, denoise strength, tint, color temperature, parametric transformation, linear piece-wise transformation, tone compression, or a face beautification parameter.

26. The device according to claim 21, the operations further comprising:
providing a trained neural network based at least in part on adjusting the layer, adjusting the first head, or adjusting the second head; and
enhancing an image input into the trained neural network.

27. The device according to claim 21, the operations further comprising:

training the neural network based at least in part on adjusting the first head and adjusting the second head; and providing the trained neural network as a service over a network.

* * * * *